United States Patent
Fontaine

[11] 3,888,552
[45] June 10, 1975

[54] AUXILIARY OPERATING APPARATUS FOR VEHICLE SERVICE BRAKE

[75] Inventor: John G. Fontaine, Fort Lauderdale, Fla.

[73] Assignee: Fail Safe Brake Corporation, Fort Lauderdale, Fla.

[22] Filed: Mar. 20, 1974

[21] Appl. No.: 452,742

Related U.S. Application Data

[62] Division of Ser. No. 346,686, March 30, 1973, Pat. No. 3,845,932.

[52] U.S. Cl.............. 303/84 R; 188/152; 303/6 R; 303/89; 417/401; 417/445
[51] Int. Cl............................................. B60t 17/16
[58] Field of Search ......... 303/13, 9, 2, 3, 6 R, 6 C, 303/89, 84 A, 84 R, 15; 251/63.4, 57, 61.4; 188/349, 265, 152; 180/77 R, 103–105, 98, 82 R; 417/401, 444, 445

[56] References Cited
UNITED STATES PATENTS

| 2,737,777 | 3/1956 | Krusemark | 303/6 C |
| 2,871,995 | 2/1959 | Cline | 188/265 X |
| 3,235,025 | 2/1966 | Quinn | 180/98 |
| 3,275,975 | 9/1966 | King | 180/98 X |
| 3,377,109 | 4/1968 | Scott | 303/6 R X |

*Primary Examiner*—Trygve M. Blix
*Assistant Examiner*—D. C. Butler
*Attorney, Agent, or Firm*—Oltman and Flynn

[57] ABSTRACT

An auxiliary operating device for a service brake including a fluid pressure operated valve with a valve stem for opening and closing an orifice connected to a source of hydraulic pressure and with a connector portion attached thereto actuated by the venting of a pressure chamber to pressurize fluid delivered to the service brake.

8 Claims, 4 Drawing Figures

AUXILIARY OPERATING APPARATUS FOR VEHICLE SERVICE BRAKE

RELATED APPLICATION

This application is a division of copending application Ser. No. 346,686 filed March 30, 1973, now U.S. Pat. No. 3,845,932, issued Nov. 5, 1974.

BACKGROUND OF THE INVENTION

There has been a need for a braking device that will apply the brakes of a vehicle upon the occurrence of a predetermined condition. The condition may be the removal of the driver of the vehicle from the driver's seat, the opening of a door as the door of a bus, or the removal of a nozzle of a fuel truck from a cradle, by way of example. Such a braking device may also be controlled by radar sensing in order to bring a vehicle to a stop or slow the vehicle down depending on the closeness of an object such as another vehicle. Attempts have been made to devise such a braking device, but the equipment has been cumbersome and difficult to construct, control and install. It is believed that the problems could be solved by the provision of a simple valve which could be connected into the hydraulic line of a hydraulic brake system leading to the wheels. However, no valve has been available that would be capable of pressurizing the fluid in the hydraulic line when the valve is closed. Another problem has been that the valve should have provisions for allowing the service brakes of the vehicle to over-ride or augment the automatic brake when the service brake pedal is depressed.

BRIEF DESCRIPTION OF THE INVENTION

The present invention provides a valve including a housing for containing fluid, a valve seat in the housing, a valve element in the housing movable to engage and disengage from the valve seat, and means in the housing responsive to a change of fluid pressure therein to operate the valve element and movable relative to the valve element after engagement of the valve element with the valve seat to pressurize fluid in the housing. This valve can be connected into a hydraulic line in a hydraulic brake system and will serve to apply brakes when the valve is closed. The valve element is preferably spring loaded and is operated by a piston. When a change in fluid pressure is applied to the piston, the valve element closes and will remain closed so long as pressure is exerted on the piston. The piston and valve element are movable relative to each other so that the piston can exert pressure on fluid in a hydraulic line to which the valve is connected after the valve element closes with the valve seat. If the service brake pedal is depressed, excess pressure will cause the valve element to rise from its seat to allow application of the increased pressure to the brakes. The valve may be used in a braking device which is actuated upon the occurrence of a predetermined condition such as the removal of a driver from the driver's seat of a vehicle. Other conditions which may be made effective to apply the brakes are the opening of the door of the vehicle which is particularly useful in a bus, or the removal of a nozzle from a cradle which is useful in a fuel truck. A radar control may be provided for the valve which will cause the vehicle to slow down or stop depending on how close the vehicle is to another object such as a vehicle.

Accordingly, it is an object of the present invention to provide an improved valve for pressurizing fluid as well as opening and closing a valve orifice.

Another object of the invention is to enable the valve to be operated by a change of fluid pressure.

A further object of the invention is to make the valve resistant to severe environmental conditions such as high and low temperatures.

Another object of the invention is to provide a valve which will close tightly and prevent leakage or bypassing of fluid through an orifice of the valve.

Still another object of the invention is to provide a valve which can be connected into a hydraulic line leading to brakes of a vehicle and that will apply the brakes of the vehicle upon the occurrence of a predetermined condition.

Another object of the invention is to provide a valve in a brake system that will apply the brakes automatically upon the removal of the driver of the vehicle from the driver's seat.

A further object of the invention is to provide a valve in a brake system controlled by radar to apply the brakes to a degree depending on the proximity of another object.

Other objects of this invention will appear from the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

Figure 1:
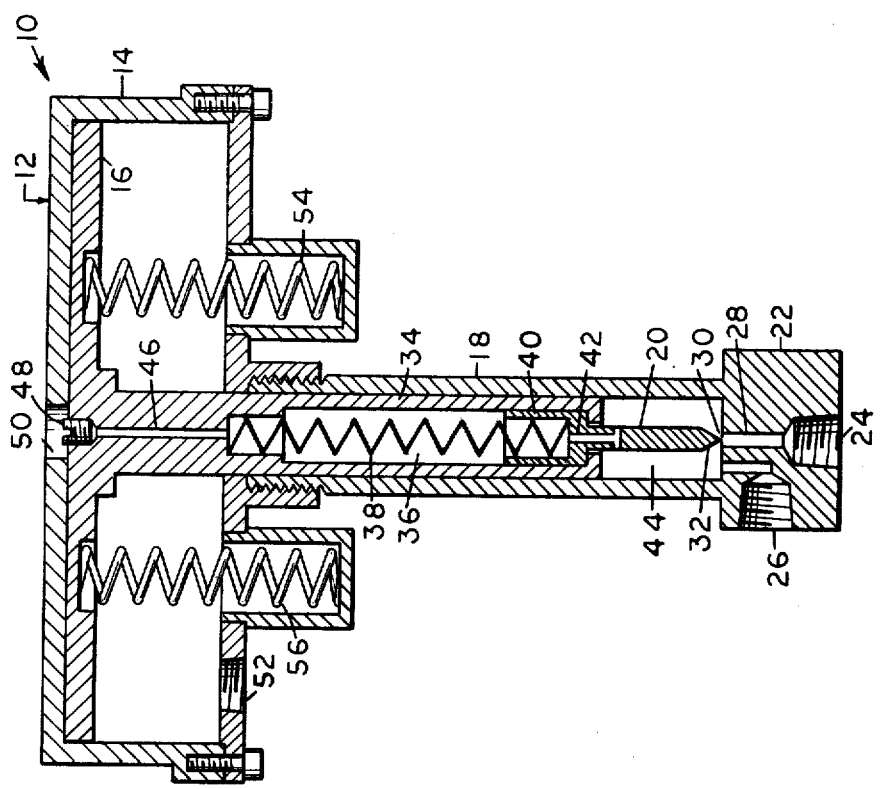
FIG. 1 is a vertical sectional view of a valve in accordance with one embodiment of the invention.
Figure 2:
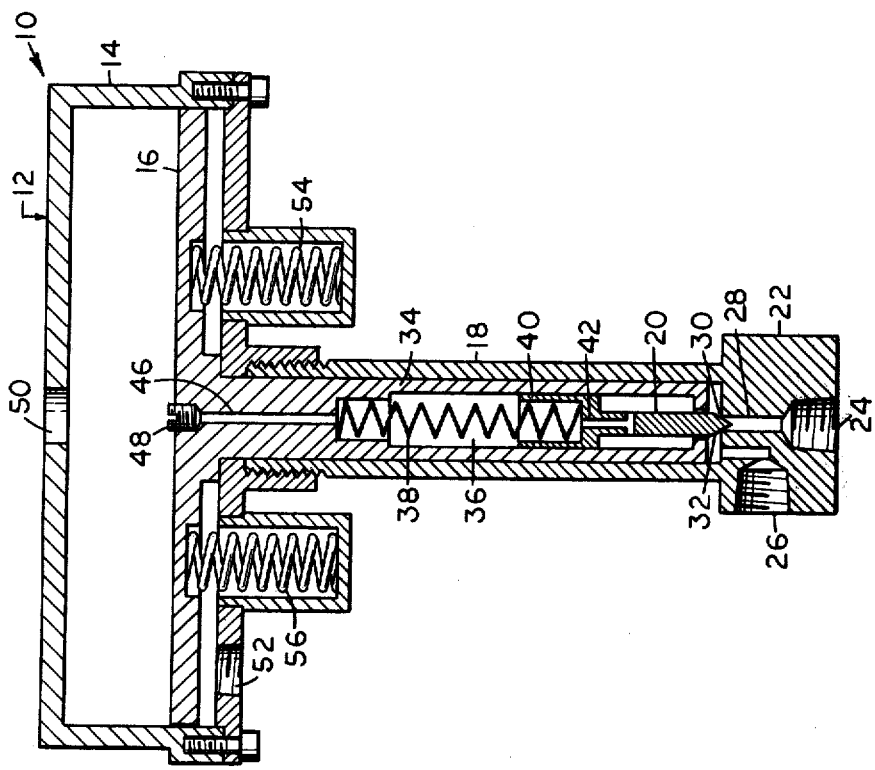
FIG. 2 is a vertical sectional view similar to FIG. 1, but showing the valve in a changed condition.

FIGS. 1 and 2 show a valve in accordance with a preferred embodiment of the invention. The valve 10 includes a housing 12 for containing fluid and the operating elements of the valve. Housing 12 includes a chamber 14 in which a piston 16 is mounted and also includes a lower extension tube 18 in which a valve element or valve stem 20 is mounted. At the lower end of housing 12 there is a coupling block 22 to which external connections are made.

Coupling block 22 has a first passage 24 and a second passage 26 which are threaded to receive connecting portions of a hydraulic line. Passage 24 communicates through an orifice 28 and a valve seat 30 with the space inside the tube 18. Passage 26 also communicates with the space inside the tube.

The lower end of the valve stem 20 has a conical tip 32 which is engageable with and disengageable from the valve seat 30 to close and open the valve. The conical tip 32 is a needle means, and it has a long tapered conical surface which will close the valve tightly and prevent leakage or bypassing of fluid through the valve seat 30 when the valve is closed. The needle means will withstand high and low temperatures without permitting leakage through the valve, and does not readily become scored or otherwise deteriorated. The conical tip 32 has an included angle at the apex thereof less than 90° and preferrably about 30°.

The piston 16 has a downwardly extending connector portion 34 which has a hollow interior 36 in which a spring 38 is received. The lower end of the spring acts on a cup 40 at the top of the valve stem 20 to bias the valve stem downwardly. There is a passage 42 in the valve stem communicating between the interior space 36 inside connector 34 and the space 44 outside the valve stem. This passage permits equalization of pressure on opposite sides of the cup 40.

The space 44 and the space 36 are filled with hydraulic fluid in the normal operation of the valve. A passage 46 extends through the piston 16 and is closed by a plug 48 which may be removed when the fluid is being placed in the spaces 36 and 44 to permit escape of air. Plug 48 is then re-inserted.

The chamber 14 of housing 12 has a vent opening 50 at the top, and an inlet opening 52 at the bottom. In the illustrated embodiment of the invention, a source of reduced pressure is connected to the inlet opening 52 for creating the reduced pressure below the piston 16 in order to pull the piston downwardly. This closes the valve since atmospheric pressure remains on the upper side of the piston. However, it will be understood that the opening 52 could serve as a vent and a source of positive pressure could be applied to the opening 50 in order to operate the valve. Similarly, these connections could be reversed. The piston 16 is biased upwardly by two springs 54 and 56 located in the chamber 14. Ordinarily, the piston 16 will be sealed relative to the chamber 14 by means of an O-ring, a diaphragm, or other suitable sealing structure. Likewise, the connector portion 34 of the piston 16 will normally be sealed relative to the tube 18 by a suitable sealing element such as an O-ring. These sealing elements have not been shown.

Figure 3:
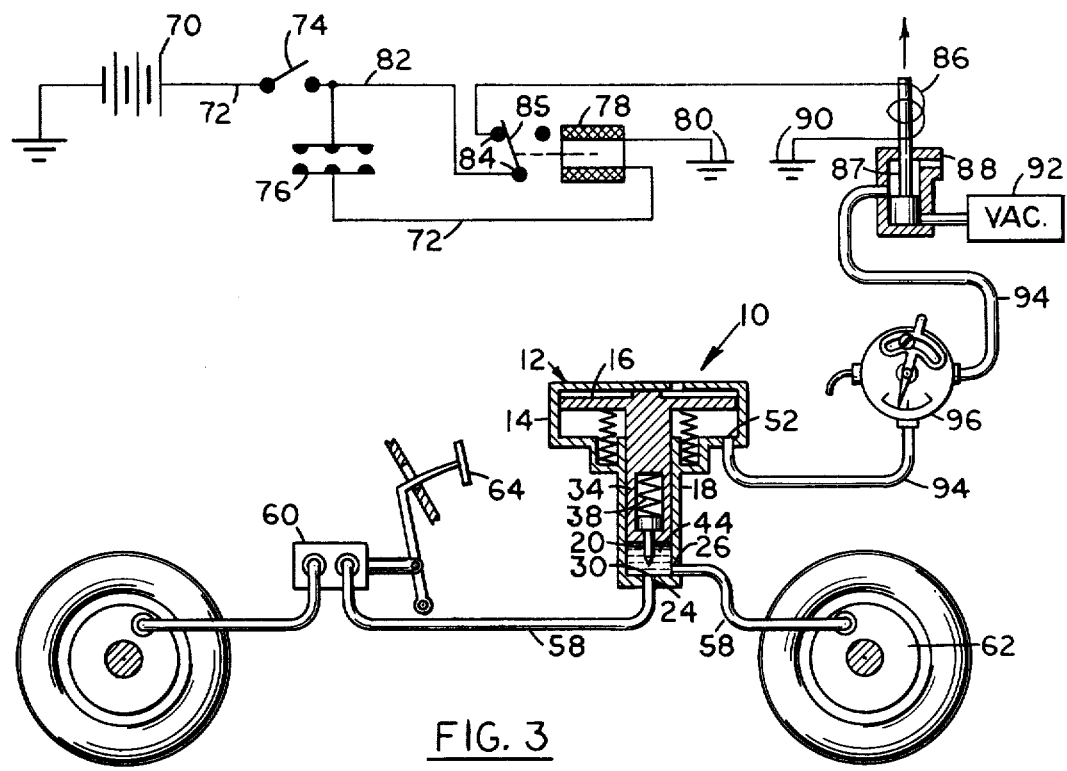
FIG. 3 is a schematic diagram of a brake system utilizing the valve of FIGS. 1 and 2.

In a typical application of the valve 10, the valve is connected in a hydraulic line such as the line 58 shown in FIG. 3. The line 58 leads from a hydraulic cylinder 60 to the rear brake 62 for a wheel of an automotive vehicle. It will be understood that there would be normally two rear brakes for the vehicle. Passage 24 is connected to the portion of line 58 leading from the hydraulic cyclinder 60, and passage 26 is connected to the portion of line 58 leading to the rear brake 62.

When the valve 10 is open, the service brakes of the vehicle can be operated normally by depressing the brake pedal 64. When the valve 10 closes, the valve stem 20 closes against the valve seat 30, and the piston 16 and connector portion 34 remain movable relative to the valve stem 20 so that the force pushing the piston 16 downwardly compresses hydraulic fluid in the space 44 adjacent the valve seat 30. This pressure automatically applies the brakes of the vehicle.

After the brakes have been applied by closing of the valve 10, the service brakes may still over-ride the valve 10 to apply increased braking force. When the brake pedal 64 is depressed, the pressure of fluid in line 58 forces the valve stem 20 upwardly off the valve seat 30 allowing this increased pressure to be applied to the rear brake 62. When the brake pedal 64 is released, the valve stem 20 again seats on the valve seat 30 to keep braking force applied. It is not until reduced pressure is removed from the piston 16 that the valve 10 opens again to release the brakes.

A control system for operating the valve 10 is illustrated in FIG. 3. The battery 70 of the vehicle is connected by line 72 through the ignition switch 74 and a seat switch 76 which is mounted inside the driver's seat of the vehicle. Line 72 also connects through a relay coil 78 to ground at 80.

A line 82 is connected from the ignition switch 74 through contacts 84 of the relay 78 and the energizing coil 86 of a solenoid valve 88 to ground at 90.

A source of reduced pressure 92 is connected through the solenoid valve 88 by conduit 94 to a metering valve 96 which can be adjusted to set the air pressure. Conduit 94 continues until it connects to the inlet 52 for chamber 14 of valve 10.

With the ignition switch 74 open, the control system and valve 10 are in the condition shown in FIG. 3. The solenoid valve 88 is de-energized, and vacuum or reduced pressure from source 92 is blocked. The valve 10 is open as shown.

When the driver sits on the seat of the vehicle, the switch 76 closes. Then when the ignition switch 74 is closed, relay 78 is energized so that movable contact 85 opens contact 84. This brakes the energizing path to coil 86 for solenoid valve 88. Thus, the valve 10 remains open.

If the driver of the vehicle should be removed from the seat of the vehicle while the ignition switch 74 is closed, the switch 76 opens to de-energize relay coil 78. Movable contact 85 then closes contacts 84 causing coil 86 to energize. The plunger 87 of the solenoid valve then moves upwardly allowing vacuum to be applied from the source 92 through the metering valve 96 to the chamber 14.

The valve 10 then closes, and pressure is applied to the fluid in space 44 causing the brake 62 to be applied automatically. The brakes are not released until the valve 10 opens again. This will occur if the driver again sits on the seat to close the switch 76 or if the ignition switch 74 is opened.

As previously mentioned, depressing of the brake pedal 64 will allow increased pressure in line 58 to open the valve element 20 so that the increased pressure may be applied to the rear brake 62.

Figure 4:
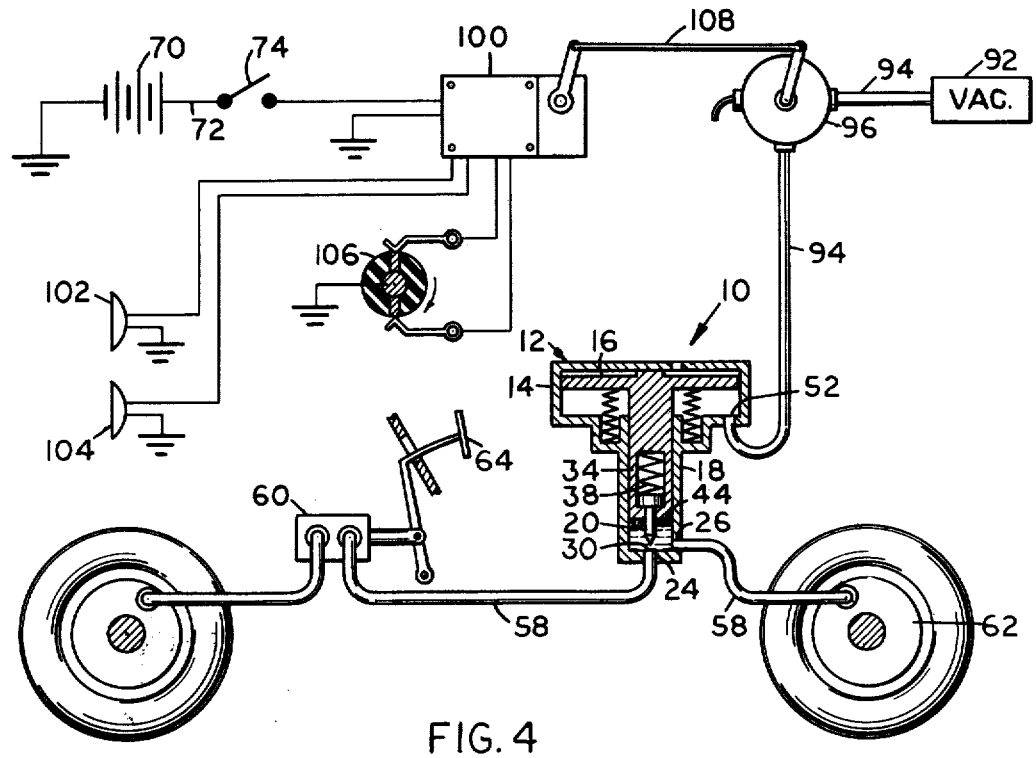
FIG. 4 is a schematic diagram of a brake system utilizing the same valve controlled by radar devices.

Another application of the valve 10 is illustrated in FIG. 4 where the same reference numbers are used for like parts. Thus the schematic representation of the vehicle and the valve 10 remains the same. The source of reduced pressure 92 and the metering valve 96 also remain the same. In this embodiment, the metering valve is connected to a control device 100 which is operated in response to signals from two radar sensing devices 102 and 104. The control device 100 is connected to the battery 70 through the ignition switch 74. An intermitent current conductor 106 is also connected to the control device 100. As long as the vehicle is moving, the intermitent current conductor 106 acts to activate the control device so that it is responsive to signals from the radar sensing devices 102 and 104. When the signals from these devices exceed a threshold level, motors (not shown) in the control device 100 drive the metering valve 96 through a linkage 108. As the metering valve 96 opens, reduced pressure is applied to the valve 10 causing it to close, and the greater the reduced pressure applied to the valve 10, the more the braking force that is applied to the brakes 62. The level of the signal supplied by the sensing devices 102 and 104 depends on the degree of proximity of another object such as another vehicle approaching the vehicle in which the valve 10 is provided. As the other vehicle gets closer, greater braking force is applied until in the extreme condition, the controlled vehicle is brought to a stop.

Thus, the invention provides a valve capable of pressurizing fluid for the purpose of applying brakes. The valve can be used in an automatic braking system to apply the brakes in response to the occurrence of a predetermined condition such as the removal of a driver from the seat of the vehicle. Other applications of the valve are possible as has been illustrated herein.

Having thus described my invention, I claim:

1. In a vehicle having a service brake operated by hydraulic fluid in a conduit means, an auxiliary operating apparatus for said service brake comprising:

a housing having a chamber, a valve stem movable axially in said housing, orifice means in said housing at one side of said chamber forming a valve seat in the path of said valve stem, first and second passages in said housing at said one side of said chamber providing a path for hydraulic fluid flow through said orifice means, piston means in said chamber for operating said valve stem, connector means for connecting said valve stem to said piston means to move said valve stem axially in said housing for opening and closing said orifice means, said connector means and said valve stem being interconnected so as to allow movement of said piston means and said connector means towards said valve seat after said valve stem engages said valve seat for pressurizing hydraulic fluid adjacent to said valve seat, and means to allow a fluid pressure change in at least one portion of said chamber to actuate said piston means, and said first and second passages being connected in hydraulic circuit with said conduit means for applying said service brake as a result of the aforesaid pressurizing of hydraulic fluid adjacent to said valve seat and for releasing said service brake upon retraction of said piston means and connector means.

2. The auxiliary brake operating apparatus as claimed in claim 1 including a source of reduced air pressure for acting on said piston means, and magnetic valve means for controlling the application of reduced air pressure from said source to said piston means to operate the same.

3. The auxiliary brake operating apparatus as claimed in claim 2 including electrical circuit means for controlling said magnetic valve means, said electrical circuit means including switch means.

4. The auxiliary brake operating apparatus as claimed in claim 1 including a source of reduced air pressure for acting on said piston means, and control means for controlling the application of reduced air pressure from said source to said piston means.

5. The auxiliary brake operating apparatus as claimed in claim 4 including electrical circuit means for operating said control means, said electrical circuit means including a radar device for sensing the approach of an object to apply the brake.

6. The auxiliary brake operating apparatus as claimed in claim 3 in which said electrical circuit means includes a relay energized to release said service brake and de-energized to apply said service brake.

7. The auxiliary brake operating apparatus as claimed in claim 6 in which said relay is de-energized in response to opening of said switch means.

8. The auxiliary brake operating apparatus as claimed in claim 7 including actuator means in hydraulic circuit with said conduit means and one of said passages to be actuated for applying increased fluid pressure to said service brakes by removing said valve stem from said orifice after closing of said orifice by said valve stem in response to opening of said switch means.

* * * * *